United States Patent
Subramanian et al.

(10) Patent No.: US 11,676,384 B2
(45) Date of Patent: Jun. 13, 2023

(54) OBJECT COUNTING SYSTEM FOR HIGH VOLUME TRAFFIC

(71) Applicant: Sensormatic Electronics, LLC

(72) Inventors: Gopi Subramanian, Delray Beach, FL (US); Joseph Celi, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 95 days.

(21) Appl. No.: 17/202,056

(22) Filed: Mar. 15, 2021

(65) Prior Publication Data

US 2022/0292287 A1 Sep. 15, 2022

(51) Int. Cl.
*G06V 20/40* (2022.01)
*G06T 7/70* (2017.01)
*G06V 10/20* (2022.01)
*G06T 7/20* (2017.01)

(52) U.S. Cl.
CPC ............... *G06V 20/46* (2022.01); *G06T 7/20* (2013.01); *G06T 7/70* (2017.01); *G06V 10/255* (2022.01); *G06T 2207/10016* (2013.01); *G06T 2207/30241* (2013.01); *G06T 2207/30242* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,185,314 B1 * | 2/2001 | Crabtree | G08B 13/19608 348/700 |
| 9,177,385 B2 | 11/2015 | Almbladh | |
| 10,872,424 B2 | 12/2020 | Daniel et al. | |
| 2006/0227862 A1 | 10/2006 | Campbell et al. | |
| 2009/0245573 A1 | 10/2009 | Saptharishi et al. | |

(Continued)

FOREIGN PATENT DOCUMENTS

EP 3435330 A1 1/2019

OTHER PUBLICATIONS

Bevilacqua et al., "Using Local and Global Object's Information to Track Vehicles in Urban Scenes," IEEE Conference on Advanced Video and Signal Based Surveillance, Sep. 2005, pp. 52-57.

(Continued)

*Primary Examiner* — Delomia L Gilliard
(74) *Attorney, Agent, or Firm* — ArentFox Schiff LLP

(57) ABSTRACT

A system may be configured to perform object counting in high volume traffic. In some aspects, the system may determine object detection information defining an absence of an object within the region of interest in a current video frame, and determine that a location associated with the object is within a placeholder-eligible area within the region of interest based on first tracker information determined in a previous video frame. Further, the system may determine second tracker information including a bounding representation for the object based at least in part on the location and object detection information, and determine, based on the second tracker information, an object count representing a number of the objects that have entered the region of interest and/or a number of the objects that have exited the region of interest.

18 Claims, 7 Drawing Sheets

(56) References Cited

U.S. PATENT DOCUMENTS

| | | | |
|---|---|---|---|
| 2012/0128212 A1* | 5/2012 | Almbladh | G06T 7/254 |
| | | | 382/107 |
| 2014/0079282 A1 | 3/2014 | Marcheselli et al. | |
| 2015/0221094 A1 | 8/2015 | Marcheselli et al. | |
| 2016/0180156 A1 | 6/2016 | Marcheselli et al. | |
| 2018/0032799 A1 | 2/2018 | Marcheselli et al. | |
| 2018/0046863 A1* | 2/2018 | Chen | G06T 7/246 |
| 2018/0268563 A1 | 9/2018 | Chen et al. | |
| 2019/0107394 A1* | 4/2019 | Allocco | G06Q 30/0277 |
| 2019/0130191 A1 | 5/2019 | Zhou et al. | |
| 2019/0130580 A1 | 5/2019 | Chen et al. | |
| 2019/0220655 A1* | 7/2019 | Prashant | G06V 20/41 |
| 2019/0304102 A1* | 10/2019 | Chen | G06T 7/11 |
| 2020/0160538 A1 | 5/2020 | Daniel et al. | |
| 2020/0380252 A1* | 12/2020 | Ding | G06Q 30/0609 |
| 2021/0357708 A1 | 11/2021 | Sakai | |
| 2022/0284666 A1 | 9/2022 | Chandler et al. | |

OTHER PUBLICATIONS

Dallal, G., "Why P=0.05?" The Little Handbook of Statistical Practice, XP055930609, Dec. 22, 2020, Retrieved from the Internet: <URL: http://www.jerrydallal.com/LHSP/p05.htm,> 4 pages.

Tani et al., "Events Detection Using a Video-Surveillance Ontology and a Rule-Based Approach," Computer Vision—ECCV 2020: 16th European Conference, Aug. 2020, pp. 299-308.

International Search Report and Written Opinion in PCT/US2022/071124, dated Jun. 21, 2022, 17 pages.

International Search Report and Written Opinion in PCT/US2022/071129, dated Jun. 22, 2022, 5 pages.

\* cited by examiner

OBJECT COUNTING SYSTEM FOR HIGH VOLUME TRAFFIC

CROSS REFERENCE TO RELATED APPLICATIONS

This application is related to co-pending U.S. patent application Ser. No. 17/202,032, by Subramanian et al., entitled "Object Counting System for High Volume Traffic," filed on Mar. 15, 2021, which is hereby incorporated by reference in its entirety.

FIELD OF TECHNOLOGY

The present disclosure relates generally to object detection systems and object tracking systems, and more particularly, to methods and systems for performing object counting in high volume traffic.

BACKGROUND

Many industries employ multi-object tracking systems in people counting applications that monitor entry and exit into a controlled area. Typically, multi-object tracking systems employ object detection and object tracking components that suffer from unsatisfactory performance when processing a sub-optimal video stream, e.g., a video stream having a low frame rate and/or decompressed frame quality. Further, object detection inaccuracy and object tracking inaccuracy significantly reduce object counting accuracy. Additionally, object counting accuracy problems are exacerbated in high traffic contexts and/or contexts with objects moving in multiple directions. Accordingly, many multi-object tracking systems fail to provide accurate counting information and/or require costly supplementary systems when employed to monitor people entering and leaving a region of interest.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for object counting in high volume traffic. In an aspect, a method for object counting in high volume traffic may comprise determining, by an object detection component configured to detect objects within a region of interest, object detection information defining an absence of an object within the region of interest in a current video frame; determining, by an object tracking component configured to track movement of the objects within the region of interest, that a location associated with the object is within a placeholder-eligible area within the region of interest based on first tracker information determined in a previous video frame; determining, by the object tracking component, second tracker information including a bounding representation for the object based at least in part on the location and object detection information; and determining, based on the second tracker information, an object count representing a number of the objects that have entered the region of interest and/or a number of the objects that have exited the region of interest.

In another aspect a system may comprise a video capture device and object counting platform comprising a memory storing instructions; and at least one processor couple to the memory and configured by the instructions to determine, by an object detection component configured to detect objects within a region of interest, object detection information defining an absence of an object within the region of interest in a current video frame; determine, by an object tracking component configured to track movement of the objects within the region of interest, that a location associated with the object is within a placeholder-eligible area within the region of interest based on first tracker information determined in a previous video frame; determine, by the object tracking component, second tracker information including a bounding representation for the object based at least in part on the location and object detection information; and determine, based on the second tracker information, an object count representing a number of the objects that have entered the region of interest and/or a number of the objects that have exited the region of interest.

In another aspect, a non-transitory computer-readable medium storing instructions that cause a processor to determine, by an object detection component configured to detect objects within a region of interest, object detection information defining an absence of an object within the region of interest in a current video frame; determine, by an object tracking component configured to track movement of the objects within the region of interest, that a location associated with the object is within a placeholder-eligible area within the region of interest based on first tracker information determined in a previous video frame; determine, by the object tracking component, second tracker information including a bounding representation for the object based at least in part on the location and object detection information; and determine, based on the second tracker information, an object count representing a number of the objects that have entered the region of interest and/or a number of the objects that have exited the region of interest.

In another aspect, a method for object counting in high volume traffic may comprise detecting, by an object detection component configured to detect objects within a region of interest, a candidate object within the region of interest in a current video frame; determining that the candidate object is a detected object based at least in part on comparing an attribute value of the candidate object to historic attribute information determined during a plurality of previous video frames; determining, by an object tracking component configured to track movement of the objects within the region of interest, track information based on the detected object; and determining, based on the bounding representation, an object count representing a number of the objects that have entered the region of interest and/or a number of the objects that have exited the region of interest.

In another aspect a system may comprise a video capture device and object counting platform comprising a memory storing instructions; and at least one processor couple to the memory and configured by the instructions to determine, by an object detection component configured to detect objects within a region of interest, a candidate object within the region of interest in a current video frame; determine that the candidate object is a detected object based at least in part on comparing an attribute value of the candidate object to historic attribute information determined during a plurality of previous video frames; determine, by an object tracking component configured to track movement of the objects within the region of interest, track information based on the detected object; and determine, based on the bounding representation, an object count representing a number of the objects that have entered the region of interest and/or a number of the objects that have exited the region of interest.

In another aspect, a non-transitory computer-readable medium storing instructions that cause a processor to determine, by an object detection component configured to detect objects within a region of interest, a candidate object within the region of interest in a current video frame; determine that the candidate object is a detected object based at least in part on comparing an attribute value of the candidate object to historic attribute information determined during a plurality of previous video frames; determine, by an object tracking component configured to track movement of the objects within the region of interest, track information based on the detected object; and determine, based on the bounding representation, an object count representing a number of the objects that have entered the region of interest and/or a number of the objects that have exited the region of interest.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
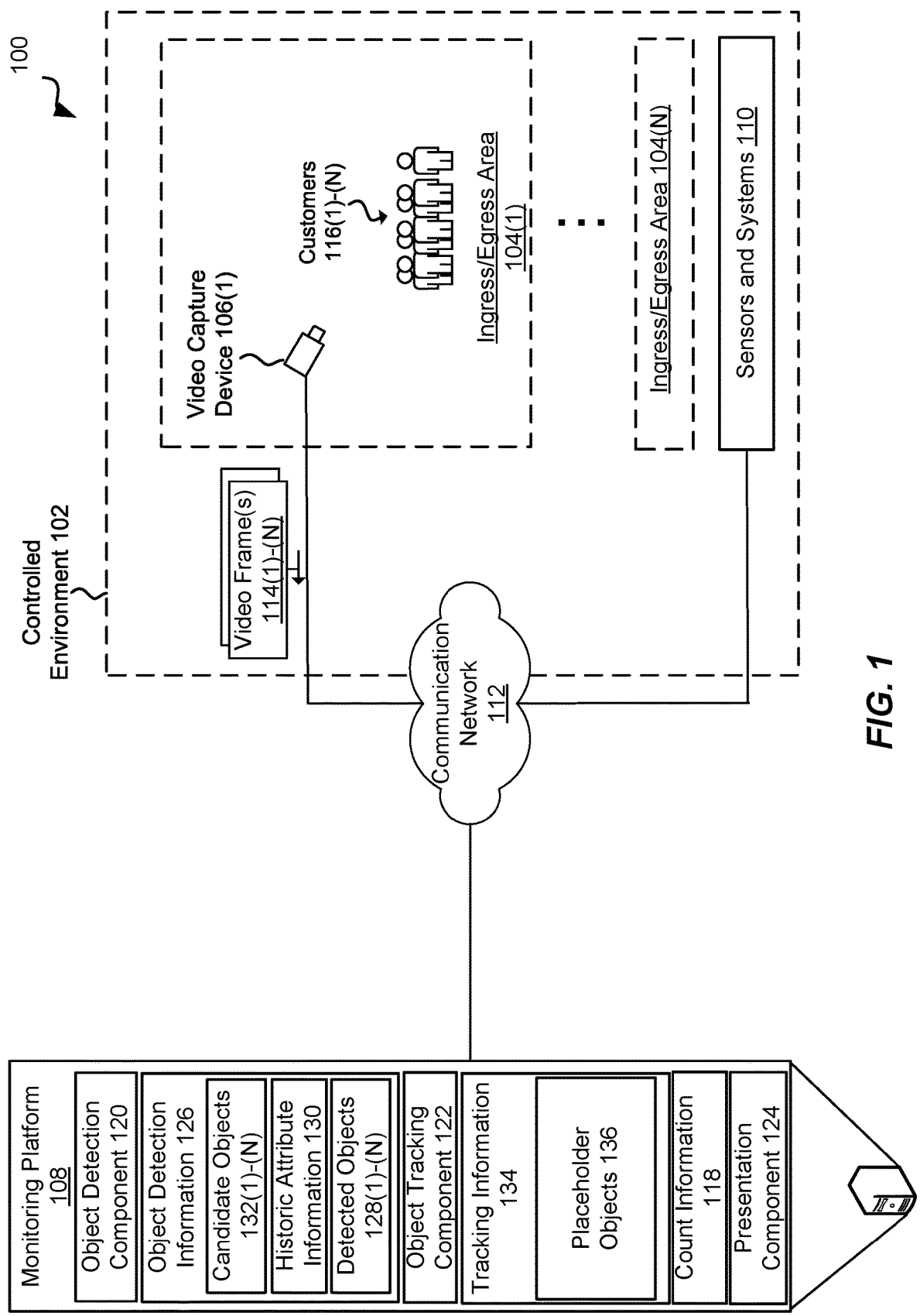
FIG. 1 is a block diagram of an example of a system for object counting in high volume traffic, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide object counting in high volume traffic. As used herein, in some aspects, "high-volume" may refer to the movement of a large number of people and/or objects. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

In some implementations, one or more problems solved by the present solution is inaccurate object counting in high volume traffic. For example, this present disclosure describes systems and methods for reducing false positives output by an object detection component by filtering candidate objects having an attribute value that significantly differs from a running average of the attribute value for previously-detected objects. Additionally, or alternatively, this present disclosure further describes systems and methods for reducing counting inaccuracy introduced by the use of placeholder bounding representations by restricting the use of placeholder bounding representations to areas unlikely to cause object identifier assignment errors. The present solution provides improved accuracy for object counting in high volume traffic contexts that have frustrated traditional object tracking systems without requiring reinstallation or reconfiguration of the video capture device.

Referring to FIG. 1, in one non-limiting aspect, a system 100 may be configured to perform object counting in high volume traffic in a controlled area 102. As illustrated in FIG. 1, the controlled area 102 may include one or more ingress/egress areas 104(1)-(N). Further, in some aspects, the system 100 may include one or more of video capture devices 106(1)-(N), a monitoring platform 108, sensors and systems 110, and a communication network 112. In some instances, the sensor and systems 110 may include one or detection systems (e.g., an electronic article surveillance system). Further, the video capture device 106, the monitoring platform 108, and the sensors and systems 110 may communicate via the communication network 112. In some implementations, the communication network 112 may include one or more of a wired and/or wireless private network, personal area network, local area network, wide area network, or the Internet.

In some aspects, the video capture devices 106(1)-(N) may be configured to capture two or more video frames 114(1)-(N) of activity within the ingress/egress areas 104(1)-(N). For instance, the video capture device 106(1) may capture activity of the persons 116(1)-(N) in the video frames 114(1)-(N), and send the video frames 114(1)-(N) to the monitoring platform 108 via the communication network 112. In some examples, the controlled area 102 may be a retail environment and the persons 116(1)-(N) may be patrons entering and exiting the controlled area 102. Although FIG. 1 illustrates one video capture device 106(1) within the ingress/egress area 104(1), in some other implementations each ingress/egress area 104(1) may include any number of video capture devices 106.

In some aspects, the monitoring platform 108 may be configured to monitor the number of the persons 116(1)-(N) entering and exiting the controlled area 102. For example, the monitoring platform 108 may be configured to receive the video frames 114(1)-(N) from the video capture device 106(1), and determine count information 118 representing the number of persons 116(1)-(N) that have entered and exited the controlled area 102 via the ingress/egress areas 104(1)-(N) over a predefined period of time. As illustrated in FIG. 1, the monitoring platform 108 may include an object detection component 120, an object tracking component 122, and a presentation component 124.

The object detection component 120 may be configured to detect objects (e.g., the persons 116(1)-(N) in the ingress/egress areas 104(1)-(N) within the video frames 114(1)-(N), and generate object detection information 126 corresponding to the objects detected within the video frames 114(1)-(N). In some aspects, the object detection component 120 may employ one or more machine learning models (e.g., a convolution neural network) to determine the detected objects 128(1)-(N) within the video frames 114(1)-(N). Further, in some aspects, the object detection information 126 may include a bounding representation (e.g., a bounding box), a predicted class, i.e., type of object (e.g., person or article), and confidence score for each of the detected objects 128(1)-(N). As used herein, in some aspects, the "confidence score" may represent the likelihood that a detected object 128 belongs to the predicted class. In some aspects, the object detection component 120 may employ a machine learning model to determine the confidence value, and determine the predicted class based at least in part on the confidence value being greater than a threshold amount or higher than another confidence value associated with a different class. Further, in some aspects, the object detection component 120 may be determine historic attribute information 128 for the detected objects 128(1)-(N) in each video frame 114. For example, the historic attribute information 130 may include an average of an attribute of the detected objects 128(1)-(N). For instance, the historic attribute information 130 may include an average of the area of the bounding representations of the detected objects 128(1)-(N). Further, in some aspects, the average may be a weighted average that applies a greater weight to the detected objects 128 detected in more recent video frames 114. For example, the object detection component may apply a first weight to the value of an attribute of a detected object 128(1) detected in a first video frame, and a second larger weight to the value of the attribute of a detected object 128(1) detected in the more recently-capture video frame 114(8). Further, in some aspects, the average may be exponentially weighted. Some other examples of attributes may be landmarks and/or features detected within the bounding representations of the previously-detected objects, and/or based upon landmarks and/or features detected within the bounding representations of the previously-detected objects.

In addition, in some aspects, the object detection component 120 may detect candidate objects 132 in the ingress/egress areas 104(1)-(N) within the video frames 114(1)-(N). As used herein, in some aspects, a "candidate object" may refer to an area within a video frame that potentially includes an object of a class being detected by an objection detection component. Further, as illustrated herein with respect to FIGS. 2A-2C, the object detection component 120 may determine that a candidate object 132 is a detected object 128 by determining an attribute value of the candidate object 132, and comparing the determined attribute value to the historic attribute information 130. For instance, if the area of the bounding representation of the candidate object 132 is within a threshold difference of an average size of bounding representations for the class of the candidate object 132, the object detection component 120 may consider the candidate object 132 to be a detected object 128. In some aspects, the threshold difference may be two standard deviations. Further, in some aspects, the object detection component 120 may consider the candidate object 132 to be a detected object 128 when the attribute value is within the threshold difference and the confidence value is above a predefined threshold. Accordingly, the object detection component 120 may reduce the probability of false positives by filtering out anomalous candidate objects 132 having one or attributes dissimilar from the historic attribute information 130 corresponding to previously-detected objects 128, and mostly likely belonging to a class or type of objects not of interest to the objection detection component.

The object tracking component 122 may be configured to generate tracking information 134 indicating the trajectory of the detected objects 128(1)-(N) over the video frames 114(1)-(N) using machine learning models and/or pattern recognition techniques. In particular, the object tracking component 122 may receive at least the bounding representations of the detected objects 128(1)-(N) from the object detection component 120 for each frame 114, and determine if the bounding representations of a current video frame 114 have corresponding bounding representations in one of the preceding video frames 114. In some instances, the object tracking component 122 may employ the predicted class information and confidence score information to determine if a current bounding representation has a corresponding historic bounding representation. Further, the object tracking component 122 may assign object identifiers to the detection objects 128(1)-(N) within the tracking information 134. For instance, if the object tracking component 122 determines that a current bounding representation has a corresponding historic bounding representation, the object tracking component 122 assigns the object identifier of the corresponding historic bounding representation to the current bounding representation. If the object tracking component 122 determines that a current bounding representation does not have a corresponding historic bounding representation in the preceding video frames 114, the object tracking component 122 assigns a new object identifier to the current bounding representation. Further, the object tracking component 122 may generate tracks corresponding to the trajectory of the detected objects 128(1)-(N) across the video frames 114(1)-(N) based on the assigned object identifiers. For example, a track may correspond to a trajectory connecting all of the bounding representations assigned to the same object identifier.

Further, in some aspects, the object tracking component 122 may be configured to generate placeholder representations 136(1)-(N) based on the tracking information 134 and the video frames 114(1)-(N). As used herein, in some aspects, a "placeholder representation" may refer to an area within a particular video frame that the object detection component 120 has determined does not includes an object and the object tracking component 122 has determined may potentially include an object based on the tracking information 134 corresponding to the one or more video frames preceding the particular video frame. The placeholder representations 136(1)-(N) may be used by the object tracking component 122 to track the trajectory of a detected object 128 even when the object detection component 120 fails to detect the detected object 128 in one or more of the video frames 114. For example, an object detected in a first video frame 114 may be obstructed in a second video frame 114, and thus undetected by the object detection component 120 in the second video frame 114. In some aspects, the object tracking component 122 may generate a placeholder representation 136 based upon the location and/or trajectory of a detected object 128 in one or more previous video frames 114. For example, if the object tracking component 122 predicts that a detected object 128 will be present in one or more subsequent video frames 114 or present within the ingress/egress area 104 for a particular amount of time, the object tracking component 122 may generate a placeholder representation 136 for the detected object 128 within the one or more subsequent video frames 114 or the video frames 114 captured by the video capture device 106 within the particular amount of time. Consequently, the object tracking component 122 may use a placeholder representation 136 to fill in a gap of a track for a detected object 128. In some aspects, the object tracking component 122 may limit the use of a placeholder representation 136 for a particular object to a predefined amount video frames or a predefined amount of time. For example, if the object tracking component 122 generates a placeholder representation 136(1) for a particular detected object 128(1) based upon the object detection component 120 failing to detect the detected object 128 in the video frame 114(3), the object tracking component 122 may continue to generate the placeholder representation 136(1) even if the object detection component 120 does not detect an object to associated with the placeholder representation 136(1) for up to 10 video frames 114 or up to two seconds.

While the use of placeholder representations works well for addressing occlusion contexts (e.g., a person walking behind a physical structure or another person within a region of interest), it may cause problems when used on the boundaries of a region of interest of a video frame 114. As used herein, a "region of interest" may refer to an area within a video frame that that will be considered for object counting. As an example, in some aspects, employing a placeholder representation in proximity to an edge of a region of interest of a video frame 114 may increase the possibility of an object identifier of an object (e.g., a person) leaving the region of interest being reused for an object (e.g., another person) entering the region of interest in a nearby location, thereby causing a false negative at the object tracking phase.

Accordingly, in some aspects, the object tracking component 122 may determine whether to generate a placeholder representation 136 based upon a location of a candidate placeholder location within a region of interest of a video frame 114. In particular, if the candidate placeholder representation would be located within a placeholder-eligible area of the region of interest, the object tracking component 122 may generate a placeholder representation 136 and assign the placeholder representation 136 the object identifier of the corresponding detected object 128. In some aspects, the placeholder-eligible area may be an inner area of the region of interest of the video frames 114, and the non-placeholder-eligible area may be a margin, border or boundary of the region of interest of the video frames or one or more other locations of the ingress/egress areas 104 associated with activity that may cause object identifier reuse or false positives. In some aspects, the region of interest, the placeholder-eligible area, and non-placeholder-eligible area may be uniform across all video frames 114 captured at the same video capture device 106.

Further, the object tracking component 122 may update the count information 118 based upon the tracks of the tracking information 134. In particular, the object tracking component 122 may increment a value representing patrons that have entered the controlled area 102 or a value representing patrons that have exited the controlled area 102 based upon a magnitude and direction of a track. For example, if a magnitude (e.g., length) of a track is above a predefined threshold and the direction of the track is away from a door within the ingress/egress area 104(1), the object tracking component 122 may increment the value representing patrons that have entered the controlled area 102. As another example, if a magnitude of a track is above a predefined threshold and the direction of the track is towards a door within the ingress/egress area 104(1), the object tracking component 122 may increment the value representing patrons that have exited the controlled area 102. Additionally, the number of patrons within the controlled area 102 may be determined from the difference between the value representing patrons that have entered the controlled area 102 and the value representing patrons that have exited the controlled area 102. Alternatively, in some aspects, the object tracking component 122 may increment or decrement a value representing patrons currently in the controlled area 102 based upon a magnitude and direction of a track. For example, if a magnitude of a track is above a predefined threshold and the direction of the track is towards a door within the ingress/egress area 104(1), the object tracking component 122 may decrement the value representing patrons that currently within the controlled area 102.

Further, the presentation component 124 may be configured to display the count information 118 within a graphical user interface (GUI). For example, the presentation component 124 may be configured to cause display of the count information 118 within a GUI on a display of the monitoring platform 108 and/or a display of a client device of the monitoring platform 108.

Figure 2A:
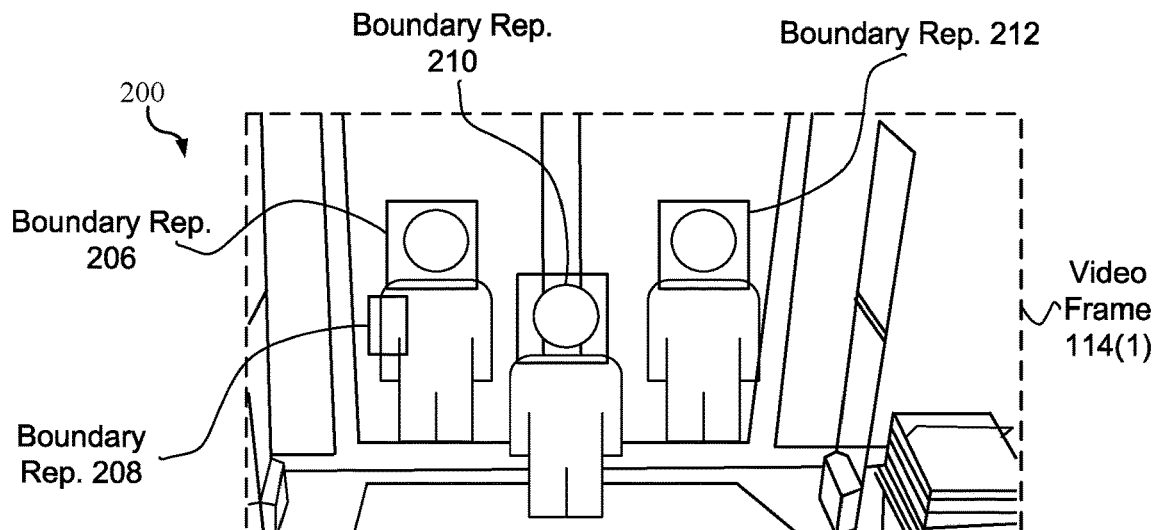
FIG. 2A illustrates a first example of object detection, according to some implementations.
Figure 2B:
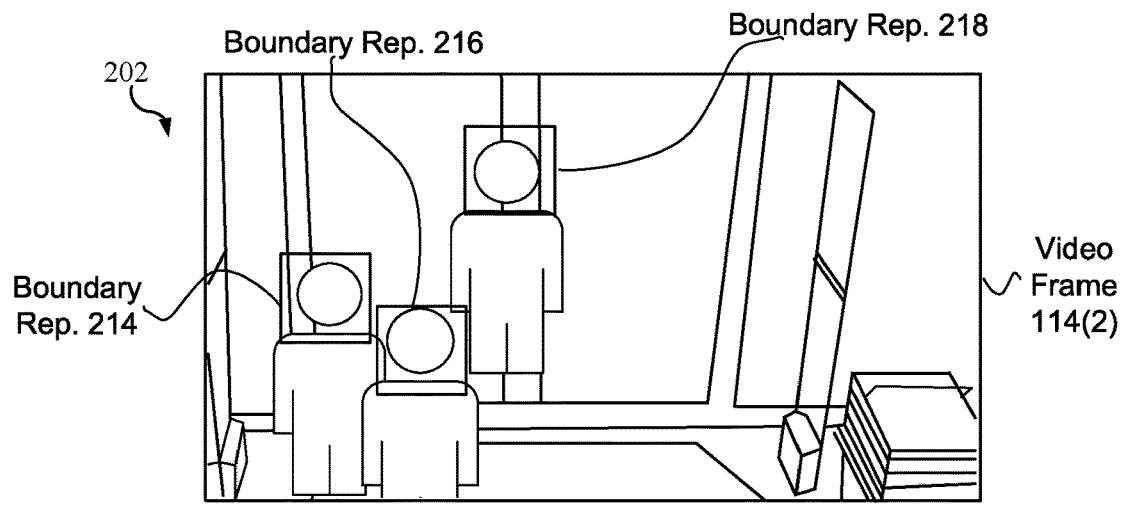
FIG. 2B illustrates a second example of object detection, according to some implementations.
Figure 2C:
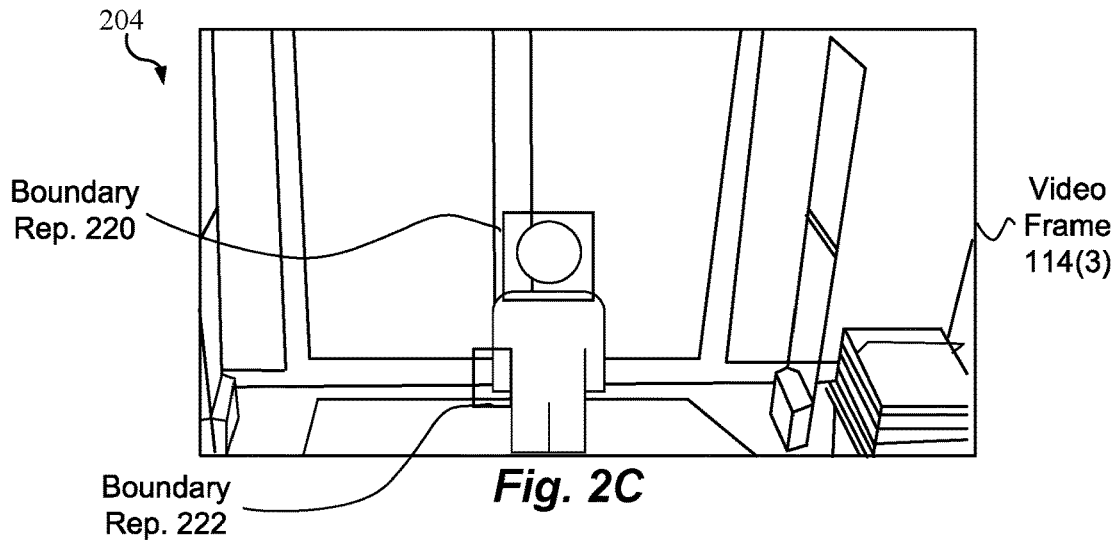
FIG. 2C illustrates a third example of object detection, according to some implementations.

FIGS. 2A-2C illustrate examples 200-204 of object detection in an object counting system for high volume traffic, according to some implementations. As illustrated in FIG. 2A, generate bounding representations (bounding rep.) 206-212 corresponding to the detected objects 128(1)-(4) in video frame 114(1), respectively. Additionally, as illustrated in FIG. 2B, the object detection component 120 may generate bounding representations 214-218 corresponding to the detected objects 128(5)-(6) in video frame 114(2), respectively. Further, the object detection component 120 may maintain a value representing an attribute of the detected objects 128(1)-(6). For example, the object detection component 120 may determine an average of the area of the detected objects 128(1)-(6).

In addition, as illustrated in FIG. 2C, the object detection component 120 may generate bounding representations 220-222 corresponding to candidate objects 132(1)-(2) in the video frame 114(3). Further, as described in detail herein, the object detection component 120 may compare the area of each of the candidate objects 132(1)-(2) to the average area of the bounding representations 206-222. For instance, the object detection component 120 may determine that the candidate object 132(1) is a detected object 128 based on the difference between the area of the bounding representation 220 and the average area of the bounding representations 206-218 being less than a predefined threshold, and determine that the candidate object 132(2) does not belong to the class of detected objects 128 based on the difference between the area of the bounding representation 222 and the average area of the bounding representations 206-218 being greater than the predefined threshold.

Figure 3A:
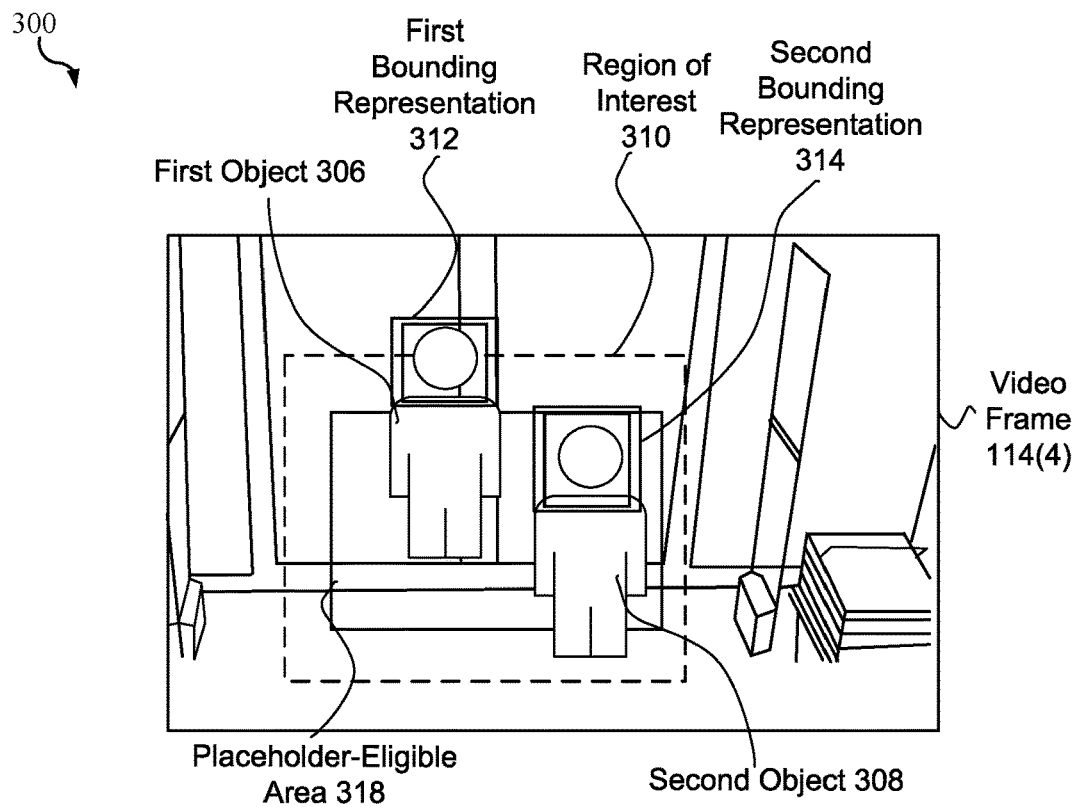
FIG. 3A illustrates a first example object tracking, according to some implementations.
Figure 3B:
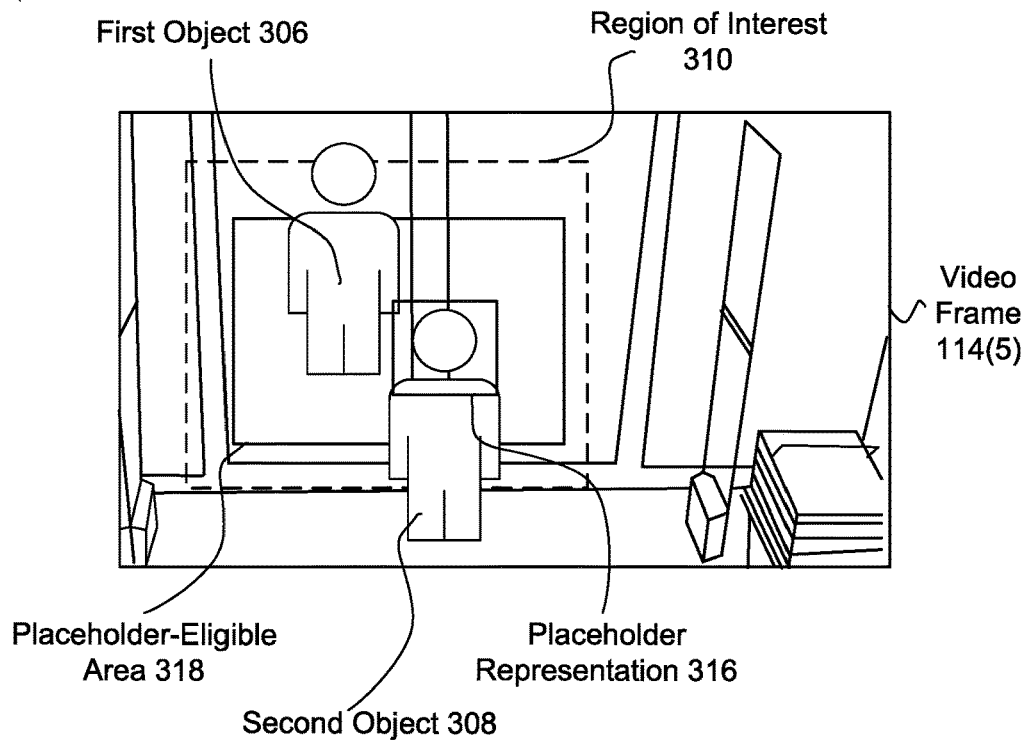
FIG. 3B illustrates a second example object tracking, according to some implementations.
Figure 3C:
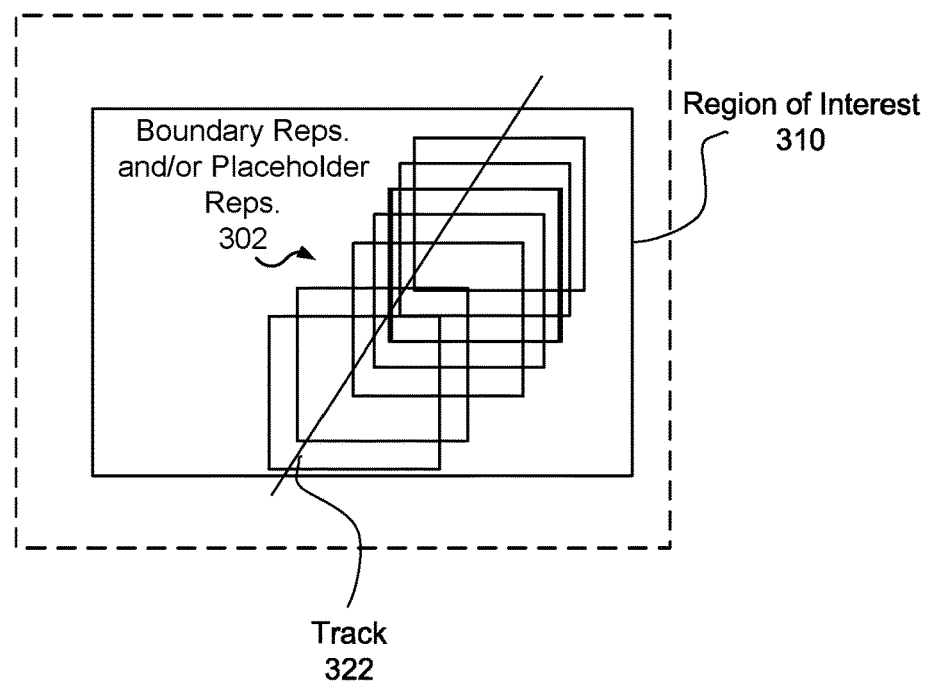
FIG. 3C illustrates a third example object tracking, according to some implementations.

FIGS. 3A-3C illustrates examples 300-304 of object tracking in an object counting system for high volume traffic, according to some implementations. As illustrated in FIG. 3A, the object detection component 120 and the object tracking component 122 may detect and track the first object 306 (e.g., detected object 128(1)) and the second object 308 (e.g., detected object 128(2)) within the region of interest 310 of the video frame 114(4). In particular, the object tracking component 122 may generate the first bounding representation 312 and the second bounding representation 314 for the first object 306 and the second object 308, respectively, based at least in part on the detection of the first object 306 and the second object 308 by the object detection component 120. Although FIGS. 3A-3C illustrate merely two objects by way of example, the object detection component 120 and the object tracking component 122 may detect and track any number of objects, and a plurality of object classes.

In addition, as illustrated in FIG. 3B, the object detection component 120 may fail to detect the first object 306 and the second object 308 in the video frame 114(5). Further, the object detection component 120 may determine whether to generate placeholder representations for the first bounding representation 312 and the second bounding representation 314. As described in detail herein, the object tracking component may generate a placeholder representation 316 for the second bounding representation 314 based on the location of the second bounding representation 314 within the video frame 114(4). In particular, the object tracking component 122 may generate the placeholder representation 316 (e.g., the placeholder representation 136(1)) for the second bounding representation 314 based on the second bounding representation 314 being located within a placeholder-eligible area 318 of the region of interest 310. Further, the object tracking component 122 may not generate a placeholder representation for the first bounding representation 312 based on the first bounding representation 312 being located outside of the placeholder-eligible area 318 (e.g., the margin) of the region of interest 310.

As illustrated in FIG. 3C, the object tracking component 122 may use the bounding representations and/or placeholder representations 320 corresponding to an object (e.g., the second object 308) to generate a track 322 representing the trajectory of a detected object within the region of interest 310. In some examples, the object tracking component 122 may determine a motion vector between the bounding representations and/or place holder representations 320 for the object in two consecutive video frames 114, and the track 322 may be the sum of the motion vectors. Further, each of the bounding representations and/or placeholder representations 320 of the track 322 may correspond to a location associated with the detected object in a video frame 114. Further, the magnitude and direction of the track 322 may be used to count objects within the region of interest 310. For example, if a magnitude of the track 322 is above a predefined threshold and the direction of the track is in a first direction within the region of interest 310, the object tracking component 122 may increment the value representing patrons that have entered the controlled area 102. As another example, if a magnitude of the track 322 is above a predefined threshold and the direction of the track is in a second direction within the region of interest 310, the object tracking component 122 may increment the value representing patrons that have exited the controlled area 102.

Figure 4:
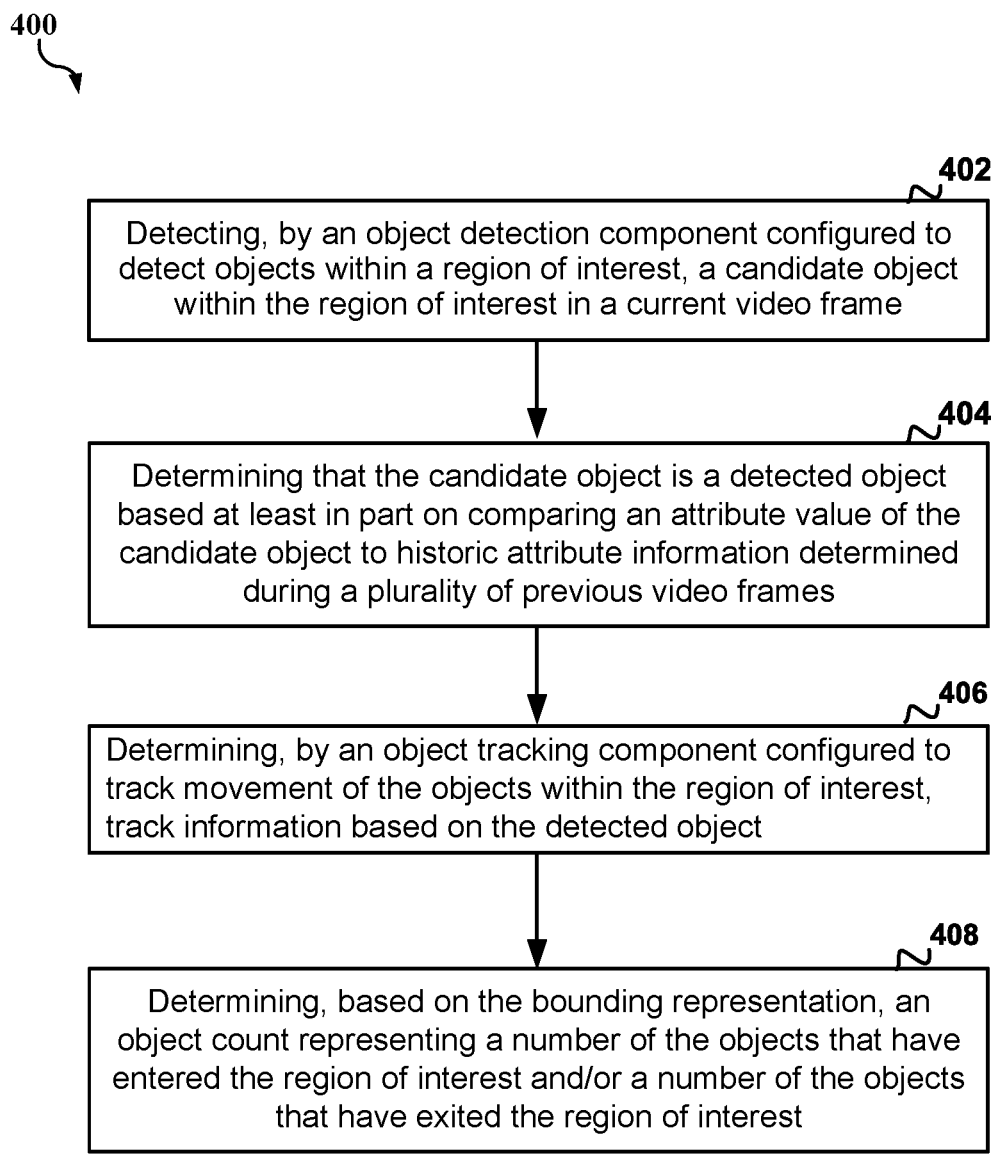
FIG. 4 is a flow diagram of a first example method of object counting in high volume traffic, according to some implementations.

Referring to FIG. 4, in operation, the monitoring platform 108 or computing device 600 may perform an example method 400 for object counting in high traffic volume. The method 400 may be performed by one or more components of the monitoring platform 108, the computing device 600, or any device/component described herein according to the techniques described with reference to FIGS. 1, 2A-2C, and 3A-3C.

At block 402, the method 400 includes detecting, by an object detection component configured to detect objects within a region of interest, a candidate object within the region of interest in a current video frame. For example, the monitoring platform 108 may receive a video frame 114(4) from the video capture device 106, and the object detection component 120 may identify a candidate object 132(2) within a region of interest of the video frame 114(4). Accordingly, the monitoring platform 108 or the processor 602 executing the object detection component 120 may provide means for detecting, by an object detection component configured to detect objects within a region of interest, a candidate object within the region of interest in a current video frame.

At block 404, the method 400 includes determining that the candidate object is a detected object based at least in part on comparing an attribute value of the candidate object to historic attribute information determined during a plurality of previous video frames. For example the object detection component 120 may determine the area of the bounding representation 222 for the candidate object 132(1), and compare the area of the bounding representation 222 to an average area of the bounding representations 206-218 for the detected objects 128(1)-(7), as stored in the historic attribute information 130. In some aspects, the average area may be a weighted average. Further, the object detection component 120 may determine that the candidate object 132(2) is a detected object 128(8) based upon the area of the bounding representation 222 being within a threshold difference of the average area of the bounding representations 206-218. In some aspects, the threshold difference is two standard deviations. Additionally, the object detection component 120 may determine that the candidate object 132(1) is not a detected object 128(8) based upon the area of the bounding representation 222 being outside of a threshold difference of the average area of the bounding representations 206-218. For instance, the candidate object 132(1) may be cellular phone with a boundary representation much smaller than a boundary representation corresponding to a person or body part of a person. Accordingly, the monitoring platform 108 or the processor 602 executing the object detection component 120 may provide means for determining that the candidate object is a detected object based at least in part on comparing an attribute value of the candidate object to historic attribute information determined during a plurality of previous video frames.

At block 406, the method 400 includes determining, by an object tracking component configured to track movement of the objects within the region of interest, track information based on the detected object. For instance, the object tracking component 122 may determine tracking information 134 for the detected object 128(8) corresponding to the movement of detected object 128(8) through the ingress/egress area 104(1). In some examples, the detected object 128(8) may be a head of a particular person walking through the ingress/egress area 104(1), and the object tracking component 122 may associate the detected object 128(8) detected in the video frame 114(3) with other detected objects from the previous video frames 114(1)-(2) to determine the track 322 representing the movement of the head of the particular person. Accordingly, the monitoring platform 108 or the processor 602 executing the object tracking component 120 may provide means for determining, by an object tracking component configured to track movement of the objects within the region of interest, track information based on the detected object.

At block 408, the method 400 includes determining, based on the bounding representation, an object count representing a number of the objects that have entered the region of interest and/or a number of the objects that have exited the region of interest. For example, the object tracking component 122 may increment the value representing patrons that have entered the controlled area 102 based on the magnitude of a track corresponding to the detected object 128(7) being above a predefined threshold and/or the direction of the track being away from a door within the ingress/egress area 104(1). As another example, the object tracking component 122 may increment the value representing patrons that have exited the controlled area 102 based on the magnitude of a track corresponding to the detected object 128(7) being above a predefined threshold and/or the direction of the track being towards a door within the ingress/egress area 104(1). Accordingly, the monitoring platform 108 or the processor 602 executing the object tracking component 122 may provide means for determining, based on the bounding representation, an object count representing a number of the objects that have entered the region of interest and/or a number of the objects that have exited the region of interest.

In an alternative or additional aspect, the candidate object may be a first candidate object, the detected object may be a first detected object, and the method 500 comprises detecting, by the object detection component, a second candidate object within the region of interest in the current video frame, and determining that the second candidate object is not a second detected object based at least in part on comparing an attribute value of the second candidate object to the historic attribute information, wherein determining the object count comprises determining the object count without using the second candidate object. Further, in examples where the monitoring platform 108 detects multiple types of objects, the method 500 may comprise comparing each candidate object to an attribute value specific to the object-class of the candidate object.

Figure 5:
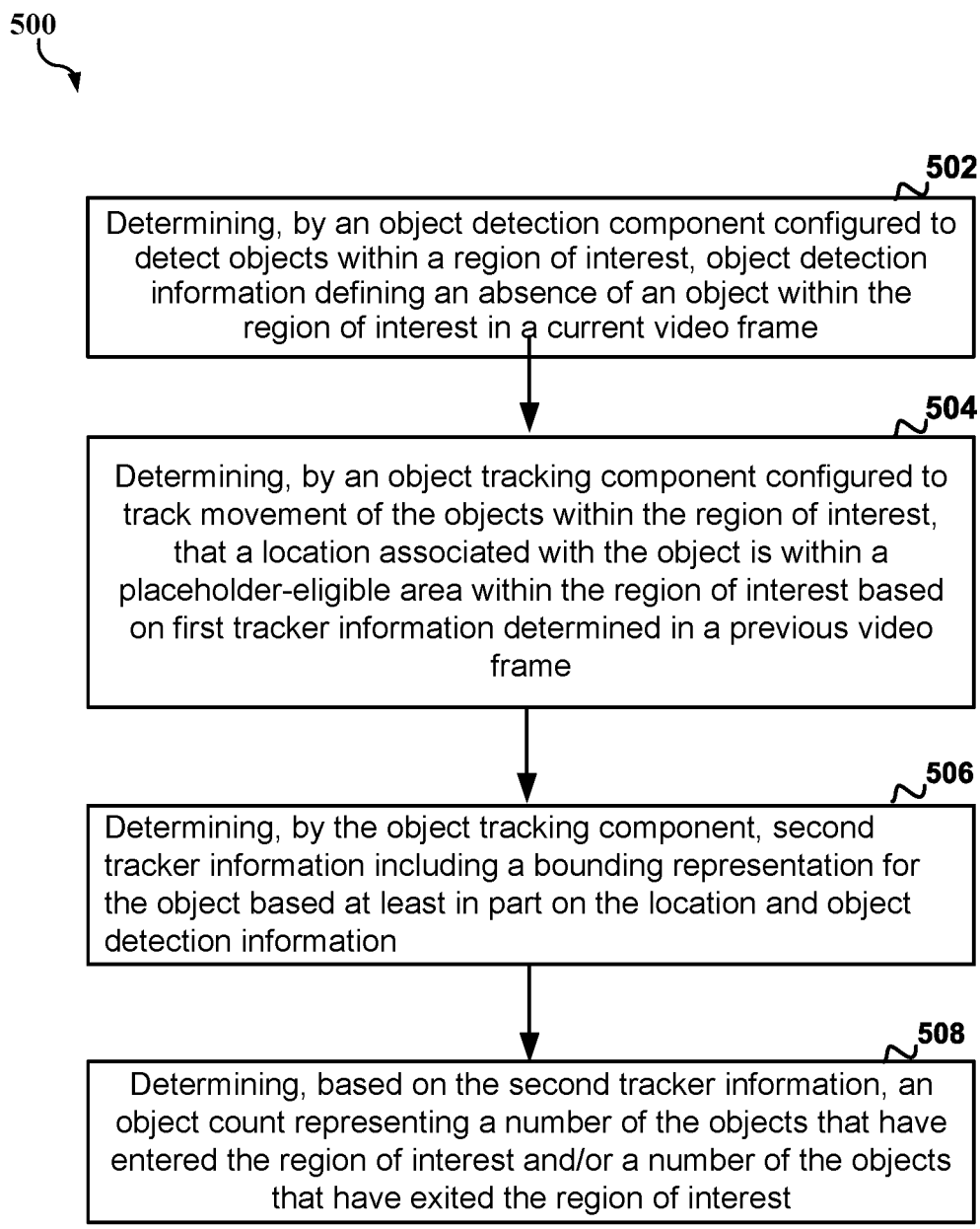
FIG. 5 is a flow diagram of a second example method of object counting in high volume traffic, according to some implementations.

Referring to FIG. 5, in operation, the monitoring platform 108 or computing device 600 may perform an example method 500 for object counting in high traffic volume. The method 500 may be performed by one or more components of the monitoring platform 108, the computing device 600, or any device/component described herein according to the techniques described with reference to FIGS. 1-3.

At block 502, the method 500 includes determining, by an object detection component configured to detect objects within a region of interest, object detection information defining an absence of an object within the region of interest in a current video frame. For example, the monitoring platform 108 may receive a video frame 114(5) from the video capture device 106, and the object detection component 120 may fail to detect the detected object 128(1) within a region of interest of the video frame 114(5). Accordingly, the monitoring platform 108 or the processor 602 executing the object detection component 120 may provide means for determining, by an object detection component configured to detect objects within a region of interest, object detection information defining an absence of an object within the region of interest in a current video frame.

At block 504, the method 500 includes determining, by an object tracking component configured to track movement of the objects within the region of interest, that a location associated with the object is within a placeholder-eligible area within the region of interest based on first tracker information determined in a previous video frame. For example, the object tracking component 122 may predict that the second object 308 will be present in the video frame 114(5) based upon a location and/or trajectory of the second object 308 in the video frames 114(1)-114(4). Further, the object tracking component 122 may determine that the location is within a placeholder-eligible area 318 of the region of interest 310. Accordingly, the monitoring platform 108 or the processor 602 executing the object tracking component 122 may provide means for determining, by an object tracking component configured to track movement of the objects within the region of interest, that a location associated with the object is within a placeholder-eligible area within the region of interest based on first tracker information determined in a previous video frame.

At block 506, the method 500 includes determining, by the object tracking component, second tracker information including a bounding representation for the object based at least in part on the location and object detection information. For example, the object tracking component 122 may generate a placeholder representation 316 corresponding to the detected object 128(1) for the video frame 114(5). In addition, the object tracking component 122 may generate the track 322 corresponding to the trajectory of the second object 308 based upon the placeholder representation 316. Accordingly, the monitoring platform 108 or the processor 602 executing the object tracking component 122 may provide means for determining, by the object tracking component, second tracker information including a bounding representation for the object based at least in part on the location and object detection information.

At block 508, the method 500 includes determining, based on the second tracker information, an object count representing a number of the objects that have entered the region of interest and/or a number of the objects that have exited the region of interest. For example, the object tracking component 122 may increment the value representing patrons that have entered the controlled area 102 based on the magnitude of the track 322 corresponding to the second object 308, and including the placeholder representation 316, being above a predefined threshold and the direction of the track 322 being away from a door within the ingress/egress area 104(1). As another example, the object tracking component 122 may increment the value representing patrons that have exited the controlled area 102 based on the magnitude of the track 322 corresponding to the second object 308, and including the placeholder representation 316), being above a predefined threshold and the direction of the track being towards a door within the ingress/egress area 104(1). Accordingly, the monitoring platform 108 or the processor 602 executing the object tracking component 122 may provide means for determining, based on the second tracker information, an object count representing a number of the objects that have entered the region of interest and/or a number of the objects that have exited the region of interest.

In an alternative or additional aspect, in order to determine that the location associated with the object is within the placeholder-eligible area, the method 500 comprises determining that the location associated with the object is not within a margin area of the region of interest. In an alternative or additional aspect, the object may be a first object, the object count may be an original object count, the object detection information may be first object detection information, and the method 500 comprises determining, by the object detection component, second object detection information defining a presence of a second object within the region of interest in a subsequent video frame, determining, by the object tracker component based on the second object detection information and the second tracker information, third tracker information representing that a second bounding representation corresponds to the first object and the second object, and determining an updated object count based on the third tracker information.

In an alternative or additional aspect, wherein the location may be a first location, the object detection information may be first object detection information, the object may be a first object, the previous video frame may be a first previous video frame, and the method 500 comprises determining, by the object detection component, second object detection information defining an absence of a second object within the region of interest of the current video frame, and determining, by the object tracker component, that a second location associated with the second object is not located within the placeholder-eligible area within the region of interest based on third tracker information determined in a second previous video frame, wherein determining the second tracker information comprises determining, by the object detection component, the second object detection information without a second bounding representation for the second object based at least in part on the second location and the second object detection information.

In an alternative or additional aspect, the bounding representation may be associated with an object identifier, a class, the location, and/or a trajectory associated with a plurality of other bounding representations of the object. In an alternative or additional aspect, the previous video frame is less than a predefined amount of frames or amount of time before the current video frame.

Although FIGS. 1-5 are discussed with respect to detecting and tracking the patrons 112(1)-(N), in some other implementations the system 100 may perform enhanced detection and tracking as described in detail herein with respect to the other objects, or the patrons 112(1)-(N) and other objects.

Figure 6:
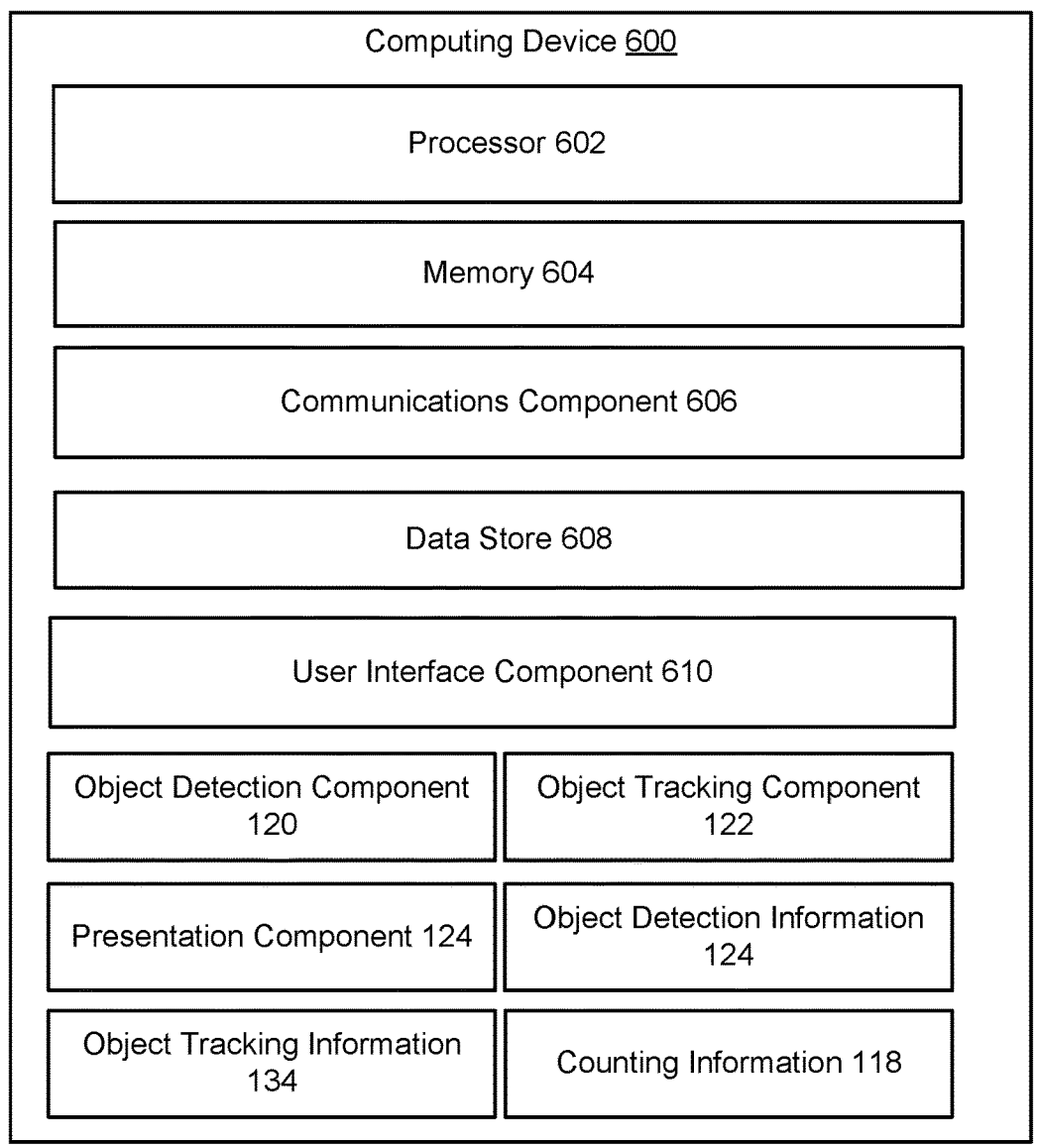
FIG. 6 is block diagram of an example of a computer device configured to implement object counting in high volume traffic, according to some implementations.

Referring to FIG. 6, a computing device 600 may implement all or a portion of the functionality described herein. The computing device 600 may be or may include or may be configured to implement the functionality of at least a portion of the system 100, or any component therein. For example, the computing device 600 may be or may include or may be configured to implement the functionality of the plurality of the video capture devices 106 and/or the monitoring platform 108. The computing device 600 includes a processor 602 which may be configured to execute or implement software, hardware, and/or firmware modules that perform any functionality described herein. For example, the processor 602 may be configured to execute or implement software, hardware, and/or firmware modules that perform any functionality described herein with reference to the, the object detection component 120, the object tracking component 122, the presentation component 124, or any other component/system/device described herein.

The processor 602 may be a micro-controller, an application-specific integrated circuit (ASIC), a digital signal processor (DSP), or a field-programmable gate array (FPGA), and/or may include a single or multiple set of processors or multi-core processors. Moreover, the processor 602 may be implemented as an integrated processing system and/or a distributed processing system. The computing device 600 may further include a memory 604, such as for storing local versions of applications being executed by the processor 602, related instructions, parameters, etc. The memory 604 may include a type of memory usable by a computer, such as random access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, and/or other components of the computing device 600.

Further, the computing device 600 may include a communications component 606 that provides for establishing and maintaining communications with one or more other devices, parties, entities, etc. utilizing hardware, software, and services. The communications component 606 may carry communications between components on the computing device 600, as well as between the computing device 600 and external devices, such as devices located across a communications network and/or devices serially or locally connected to the computing device 600. In an aspect, for example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, that provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

What is claimed is:

1. A method comprising:
   determining a presence of a first object and a second object within a region of interest in one or more previous video frames;
   determining first object detection information defining an absence of the first object within the region of interest in a first current video frame;
   determining that a location associated with the first object is within a placeholder-eligible area within the region of interest based on first tracker information determined in the one or more previous video frames;
   determining in response to the location associated with the first object being within the placeholder-eligible area, second tracker information including a first bounding representation for the first object based at least in part on the location and the first object detection information;
   determining second object detection information defining an absence of the second object within the region of interest of a second current video frame;
   determining that a second location associated with the second object is not located within the placeholder-eligible area within the region of interest based on third tracker information determined in the one or more previous video frames,
   wherein determining the second tracker information comprises determining that the second tracker information does not include a second bounding representation for the second object in response to the second location associated with the second object not being located within the placeholder-eligible area; and
   determining, based on the second tracker information including at least the first bounding representation, but not the second bounding representation, an object count representing a number of the objects that have entered the region of interest and/or a number of the objects that have exited the region of interest.

2. The method of claim 1, wherein determining that the location associated with the first object is within the placeholder-eligible area comprises determining that the location associated with the object is not within a margin area of the region of interest.

3. The method of claim 1, wherein determining, based on the second tracker information, the object count comprises incrementing or decrementing the object count based on a direction and/or magnitude of a trajectory of a plurality of bounding representations, the plurality of bounding representations including the first bounding representation.

4. The method of claim 1, wherein the object count is an original object count, and further comprising:
   determining, third object detection information defining a presence of a third object within the region of interest in a subsequent video frame;
   determining, based on the third object detection information and the second tracker information, fourth tracker information representing that a third bounding representation of the third object corresponds to the first object; and
   determining an updated object count based on the fourth tracker information.

5. The method of claim 1, wherein the first bounding representation is associated with an object identifier, a class, the location, and/or a trajectory associated with a plurality of other bounding representations of the first object.

6. The method of claim 1, wherein the one or more previous video frames are less than a predefined amount of frames or amount of time before the first current video frame.

7. A system comprising:
   a video capture device; and
   object counting platform comprising:
      a memory storing instructions thereon; and
      at least one processor coupled to the memory and configured by the instructions to:
         receive video frames from the video capture device;
         determine a presence of a first object and a second object within a region of interest in one or more previous video frames;
         determine first object detection information defining an absence of the first object within the region of interest in a first current video frame;
         determine that a location associated with the first object is within a placeholder-eligible area within the region of interest based on first tracker information determined in the one or more previous video frames;
         determine in response to the location associated with the first object being within the placeholder-eligible area, second tracker information including a first bounding representation for the first object based at least in part on the location and the first object detection information;
         determine second object detection information defining an absence of the second object within the region of interest of a second current video frame;
         determine that a second location associated with the second object is not located within the placeholder-eligible area within the region of interest based on third tracker information determined in the one or more previous video frames;
         determine that the second tracker information does not include a second bounding representation for the second object in response to the second location associated with the second object not being located within the placeholder-eligible area; and
         determine, based on the second tracker information including at least the first bounding representation, but not the second bounding representation, an object count representing a number of the objects that have entered the region of interest and/or a number of the objects that have exited the region of interest.

8. The system of claim 7, wherein to determine that the location associated with the first object is within the placeholder-eligible area, the at least one processor is configured to determine that the location associated with the first object is not within a margin area of the region of interest.

9. The system of claim 7, wherein to determine, based on the second tracker information, the object count, the at least one processor is configured to increment or decrement the object count based on a direction and/or magnitude of a trajectory of a plurality of bounding representations, the plurality of bounding representations including the first bounding representation.

10. The system of claim 7, wherein the object count is an original object count and the at least one processor is further configured to:
determine third object detection information defining a presence of a third object within the region of interest in a subsequent video frame;
determine, based on the third object detection information and the second tracker information, fourth tracker information representing that a third bounding representation of the third object corresponds to the first object; and
determine an updated object count based on the fourth tracker information.

11. The system of claim 7, wherein the first bounding representation is associated with an object identifier, a class, the location, and/or a trajectory associated with a plurality of bounding representations of the first object.

12. The system of claim 7, wherein the one or more previous video frames are less than a predefined amount of frames or amount of time before the first current video frame.

13. A non-transitory computer-readable device having instructions thereon that, when executed by at least one computing device, causes the at least one computing device to perform operations comprising:
determining a presence of a first object and a second object within a region of interest in one or more previous video frames;
determining first object detection information defining an absence of the first object within the region of interest in a first current video frame;
determining that a location associated with the first object is within a placeholder-eligible area within the region of interest based on first tracker information determined in the one or more previous video frames;
determining in response to the location associated with the first object being within the placeholder-eligible area, second tracker information including a first bounding representation for the first object based at least in part on the location and the first object detection information;
determining second object detection information defining an absence of the second object within the region of interest of a second current video frame;
determining that a second location associated with the second object is not located within the placeholder-eligible area within the region of interest based on third tracker information determined in the one or more previous video frames,
wherein determining the second tracker information comprises determining that the second tracker information does not include a second bounding representation for the second object in response to the second location associated with the second object not being located within the placeholder-eligible area; and
determining, based on the second tracker information including at least the first bounding representation, but not the second bounding representation, an object count representing a number of the objects that have entered the region of interest and/or a number of the objects that have exited the region of interest.

14. The non-transitory computer-readable device of claim 13, wherein determining that the location associated with the first object is within the placeholder-eligible area comprises determining that the location associated with the object is not within a margin area of the region of interest.

15. The non-transitory computer-readable device of claim 13, wherein determining, based on the second tracker information, the object count comprises incrementing or decrementing the object count based on a direction and/or magnitude of a trajectory of a plurality of bounding representations, the plurality of bounding representations including the first bounding representation.

16. The non-transitory computer-readable device of claim 13, wherein the object count is an original object count, and the operations further comprise:
determining, third object detection information defining a presence of a third object within the region of interest in a subsequent video frame;
determining, based on the third object detection information and the second tracker information, fourth tracker information representing that a third bounding representation of the third object corresponds to the first object; and
determining an updated object count based on the fourth tracker information.

17. The non-transitory computer-readable device of claim 13, wherein the first bounding representation is associated with an object identifier, a class, the location, and/or a trajectory associated with a plurality of other bounding representations of the first object.

18. The non-transitory computer-readable device of claim 13, wherein the one or more previous video frames are less than a predefined amount of frames or amount of time before the first current video frame.

* * * * *